G. HECOX.
SHOVEL HANDLE.
APPLICATION FILED JULY 27, 1916.

1,291,505.

Patented Jan. 14, 1919.

George Hecox
Inventor

By Geo. P. Kimmel
Attorney

UNITED STATES PATENT OFFICE.

GEORGE HECOX, OF SPRINGFIELD CENTER, NEW YORK.

SHOVEL-HANDLE.

1,291,505.  Specification of Letters Patent.  Patented Jan. 14, 1919.

Application filed July 27, 1916. Serial No. 111,658.

*To all whom it may concern:*

Be it known that I, GEORGE HECOX, a citizen of the United States, and resident of Springfield Center, in the county of Otsego and State of New York, have invented certain new and useful Improvements in Shovel-Handles, of which the following is a specification.

The present invention relates to new and useful improvements in handles for agricultural implements such as shovels, hay forks, hoes and the like and has for its primary object the provision of an improved type of handle having means associated therewith for detachably connecting the blade of a shovel or a hoe to a handle, or for replacing a hoe blade or handle when the same has been broken or worn out.

Another object of my invention is to provide a device of the character described which may be applied to any of the existing types of shovels by merely modifying the shape and size of the parts, the device being cheap to manufacture and quickly and easily assembled.

Other objects and advantages to be derived from the use of my improved handle for agricultural implements will appear from the following detail description and the claim, taken with an inspection of the accompanying drawing, in which:

Figure 1:
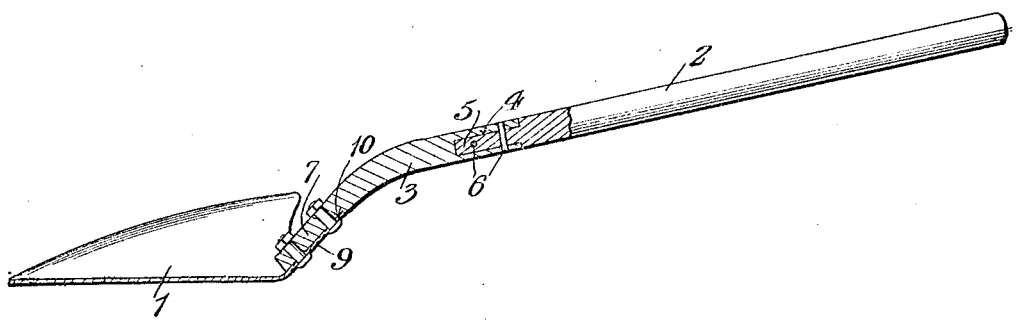
Figure 1 is a fragmental longitudinal sectional view of handle embodying the improvements of my invention, showing the same applied to a shovel.
Figure 2:
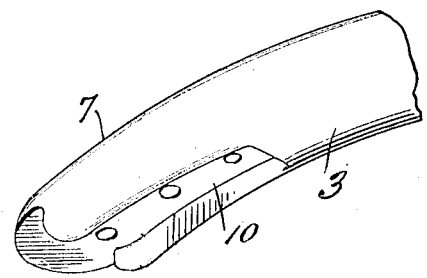
Fig. 2 is a fragmentary detail in perspective of the novel form of connection.

Referring more particularly to the drawing, wherein similar characters of reference designate like and corresponding parts throughout the various views, I have provided a connecting element for disposition between the handle and blade of a shovel or the like. As shown in Fig. 1, the shovel blade has been shown and designated 1, and a handle 2. The device of my invention includes a metallic arm 3 having a recess 4 in the free end thereof for reception of the reduced portion 5 of the handle 2, transverse pins 6 serving to maintain said reduced portion within said opening. The pins may be made of wood or any suitable material. However, the portion 3 is preferably formed of metal and the handle 2 of wood.

The shovel blade 1 is provided with an extension 9 adapted to engage in a recess 10 formed in the arm 7, the walls of said recess terminating short of the adjacent end of the arm 7 while said end of the arm is curved outwardly thus forming a projecting lip for engaging and bracing the extension 9, it being also understood in this connection, that the formation of the walls of the recess 10 provides shoulders against which portions of the blade 1 abut. Bolts 11 extend through the arm 7 for retaining the blade on the member 3. It will be seen that should the handle become broken or the blade worn out a new handle or blade may easily be supplied, materially increasing the life of the shovel blade or handle as the case may be.

From the foregoing, the advantages afforded by my invention will be obvious, it being possible to substitute a new shovel blade or hoe blade for a worn out blade without throwing away the handle, which in the course of time amounts to considerable expense under old methods.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

In a device of the character described the combination of a handle, a connector including a cylindrical body portion secured to one end of said handle and projecting beyond the same, said body having formed in its outer end a longitudinally extending recess with parallel side walls, an implement having a projecting shank positioned within said recess between the side walls, transverse bolts extending through said shank and body for detachably connecting the same, the ends of the side walls of said recess terminating short of the outer end of the body to form shoulders against which the edge of the implement is positioned, and a projecting lip formed by said outer end of the body engaging the implement to additionally support the same in position.

In testimony whereof, I affix my signature hereto.

GEORGE HECOX.

Copies of this patent may be obtained for five cents each, by addressing the "Commissioner of Patents, Washington, D. C."